United States Patent [19]

Oishi et al.

[11] Patent Number: 4,837,046
[45] Date of Patent: Jun. 6, 1989

[54] METHOD FOR FORMING FERRITE FILM

[75] Inventors: Masao Oishi, Neyagawa; Takao Saito, Toyonaka; Katsukiyo Ishikawa, Kuze; Masanori Abe, Tokyo; Yutaka Tamaura, Yokohama, all of Japan

[73] Assignee: Nippon Paint Co., Ltd., Osaka, Japan

[21] Appl. No.: 82,638

[22] Filed: Aug. 7, 1987

[30] Foreign Application Priority Data

Aug. 8, 1986 [JP] Japan .................. 61-187365

[51] Int. Cl.$^4$ .............................................. H01F 10/02
[52] U.S. Cl. ...................... 427/38; 427/128; 427/129; 427/130; 427/240; 427/346; 427/425; 427/426; 427/427; 427/428; 427/443.1
[58] Field of Search ............... 427/127-132, 427/48, 426, 38, 425, 427, 428, 443.1, 240, 346; 428/900, 694

[56] References Cited

U.S. PATENT DOCUMENTS 2,956,900 10/1960 Carlson et al. ............... 427/426 X
3,642,521 2/1972 Moltzan et al. ................ 427/426 X Primary Examiner—Bernard Pianalto
Attorney, Agent, or Firm—Wenderoth, Lind & Ponack

[57] ABSTRACT

Disclosed is a method for forming a ferrite film comprising, flowing downward or spraying an aqueous oxidizing agent solution on a substrate in a deoxidized atmosphere and simultaneously supplying an aqueous deoxidized solution containing at least ferrous ions, to effect a ferrite crystallization reaction on the substrate. This ferrite film is used for magnetic recording media, photomagnetic recording media, magnetic heads, etc.

9 Claims, 1 Drawing Sheet

METHOD FOR FORMING FERRITE FILM

FIELD OF THE INVENTION

The present invention relates to a method for forming a spinel structure ferrite film containing $Fe^{3+}$ which is widely applied to magnetic recording media, photomagnetic recording media, magnetic heads and the like.

BACKGROUND OF THE INVENTION

Conventional methods for forming a ferrite film on a solid surface are generally classified into a coating method wherein a binder is employed and a method wherein no binder is employed.

The coating method is usually applied to the production of the ferrite film for a magnetic tape, a magnetic disc and the like, but it has some defects. For example, the magnetic recording density is low because a nonmagnetic binder is present between ferrite particles and therefore it is difficult to apply to an electronic element which is required to be polycrystalline. It is also limited to gamma-$Fe_2O_3$ and $Fe_3O_4$ type ferrite which are generally obtained in needly shape, since shape anisotropy of the ferrite particles is utilized for obtaining magnetic anisotropy of the ferrite film.

The method wherein no binder is employed includes a solution coating method; an electrophoretic electrodeposition method; a dry plating method such as spattering, vaccum deposition and arc discharge; a melt spray method, and a gas-phase growth method. However, these methods require high temperatures (300° C. or more) and cannot use as a substrate a material having a low melting point, low decomposition temperature or poor heat stability.

Therefore, the inventors have proposed a novel method (Japanese Laid-open Patent Application No. 111,929/1982) which is quite different in technical concept from the conventional ferrite film forming methods described above. In this method, the surface of a solid is brought in contact with an aqueous solution containing at least ferrous ions, to absorb $FeOH^+$ or a combination of $FeOH^+$ and other metal hydroxyoxide ions and the absorbed $FeOH^+$ is oxidated to conduct ferrite crystallization reaction. This method is hereinafter referred to as a "wet plating method" in contrast to the conventional methods.

The wet plating method, however, has not attained satisfactory rate of formation in the on an industrial scale production. Thus, various improvements have been proposed to obtain a higher rate of formation and better quality of ferrite film.

The formation of the ferrite film proceeds by alternately effecting absorption of the ferrous ions or other metal ions and oxidation of the absorbed ions, as described above. Accordingly, a method has been proposed in which an immersion of a substrate into an aqueous metal ion solution and oxidation, which may be conducted by contacting with a mixed $N_2$ and $O_2$ gas, are alternately performed. This method, however, is not practicable because the process is complicated. The method may be considered as conducting the immersion and oxidation simultaneously on the surface of the substrate, but this leads to the production of a ferrite film a poor quality since small particles of ferrite are produced at the same time as the formation of the ferrite film. Great effort must be exerted to remove such ferrite particles.

For solving the above problems, Japanese Laid-open Patent Application No. 179877/1986 proposes that an aqueous solution containing $Fe^{2+}$ be sprayed on a rotating substrate. However, since this method is conducted in an oxidizing condition, oxidization is not proceeded uniformly on the substrate and therefore it is difficult to obtain a uniform ferrite film on the substrate.

SUMMARY OF THE INVENTION

The inventors have found that the origin of these difficulties is in that the reaction is always effected in an oxidizing atmosphere, and the control of oxidation is relatively difficult. Thus, the inventors have studied ways to facilitate the control of the reaction by changing the oxidizing conditions.

The present invention provides a method of forming a ferrite film comprising flowing downward or spraying an aqueous oxidizing agent solution on a substrate in a deoxidized atmosphere and simultaneously supplying an aqueous deoxidized solution containing at least ferrous ions, to effect ferrite crystallization reaction on the substrate.

DETAILED DESCRIPTION OF THE INVENTION

Figure 1:
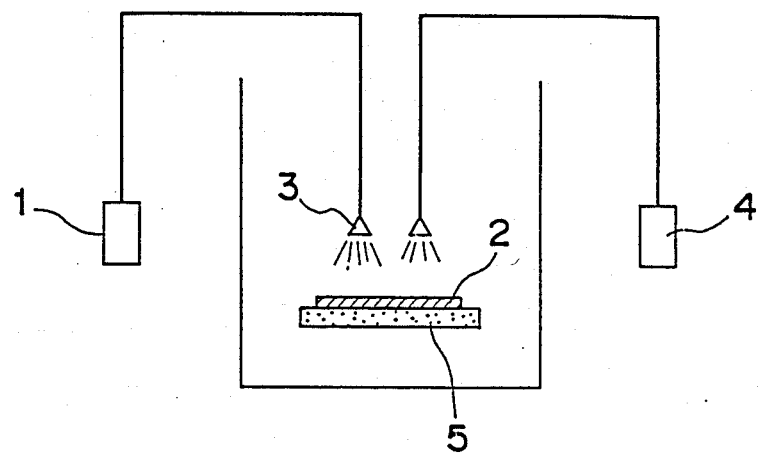
FIG. 1 is a schematical view showing one embodiment of the apparatus for the present invention.

According to the invention, an aqueous oxidizing agent solution (1) is caused to flowed downward or is sprayed on the surface of the substrate (2) for forming a ferrite film thereon. FIG. 1 shows one embodiment of spraying from the spray nozzle (3), but the solution can be let to flow dropwise. The oxidizing agent solution (1) is an aqueous solution containing an oxidizing agent such as a nitrite, a nitrate, a perchlorate, hydrogen peroxide, an organic peroxide and oxygen present in a dissolved condition. Preferred are an aqueous solution containing a nitrite or disolved oxygen in view of the oxidizing ability of these material. Most preferred is an aqueous nitrite solution, because, in case of oxygen, oxygen must be introduced in a large amount. The aqueous oxidizing agent solution may contain a buffer solution for stabilizing pH.

When the aqueous oxidizing agent solution is caused to flowed downward or sprayed on the substrate as in the invention, the oxidation reaction can proceed only on the substrate surface, and the progress of the oxidation reaction and the decrease of the amount of the ferrite particles produced in the reaction solution can be controlled by controlling the quantity (concentration) and kind of oxidizing agent solution. Further, the oxidation reaction on the substrate becomes independent of the thickness of the aqueous solution. In the oxidizing atmosphere so far, the oxidation reaction varies depending upon the thickness of the aqueous solution, because it is dependent upon the diffusion of the oxidizing gas.

Figure 2:
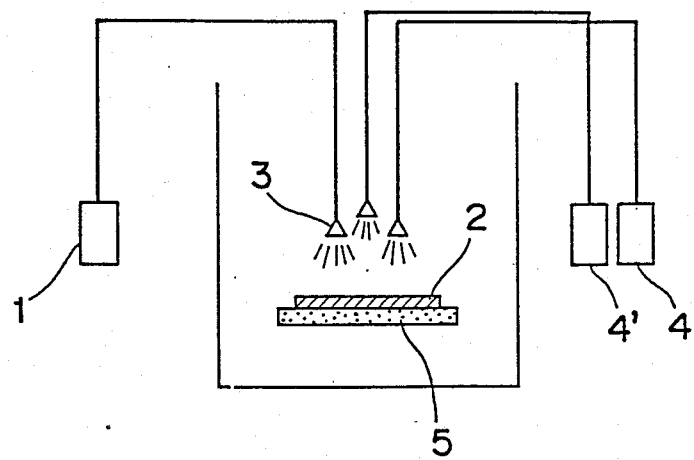
FIG. 2 is a schematical view showing another embodiment of the apparatus for the present invention.

In the present invention, it is preferable to give fluidity to both the aqueous solutions so that the reaction by the aqueous oxidizing agent solution (1) or by the aqueous deoxidized solution (4) containing ferrous ions occurs uniformly and homogeneously on the substrate (2) surface. The fluidity may be given, for example, by the action of centrifugal force with the substrate placed on a rotary disk (5) as shown in FIGS. 1 and 2, or by the action of gravity with the substrate placed inclined or vertically.

Further, it is particularly preferable to make the aqueous solutions continuously flow out (overflow) of the substrate surface by the fluidity thereof, since the aqueous solution on the substrate is always renewed with a new supply solution and the ferrite particles produced in the solution are discharged by the flow out of the system. It is preferable in the invention to place the substrate on a rotary disk and impart the fluidity by centrifugal force to the aqueous solution for making the thickness of the supplied solutions uniform and thin. By continuously flowing the aqueous solution on the substrate out of the system by centrifugal force, ferrite production can at all times be effected by using a newly replenished aqueous solution. It is desirable in this case to rotate the substrate surface at from 100 to 2000 rpm, preferably from 150 to 500 rpm.

The quanitities of the aqueous oxidizing solution (1) and the aqueous deoxidized solution (4) supplied on the substrate surface, are generally selected depending upon the temperature of the substrate surface and the degree of the fluidity given to the aqueous solutions. They are generally from 0.01 to 10 ml/cm$^2$ min, preferably from 0.1 to 1 ml/cm$^2$ min. Amounts more than the above range are unfavorable for the uniformity and homogeneity of the ferrite film produced, and amounts less than the above range make the consumption of the aqueous solution larger and maintenance of the temperature difficult.

The aqueous deoxidized solution (4) for supplying iron atoms (Fe) and oxygen atoms (O) used in forming the ferrite film, and for supplying other metal atoms (M) as required is obtained by dissolving the metal salts in water or dissolving the metals themselves in an acid. For ferrous ions and other metal ions ($M^{n+}$) to be absorbed onto the surface of a specified substrate to effect a series of ferrite film forming reactions, it is necessary to make the metal hydroxide ions present in the above aqueous solution. The anions in the aqueous solution are, for example, inorganic acid ions such as chloric ions and sulfuric ions, and organic acid ions such as acetic ions and tartaric ion; preferably chloric ions and acetic ions. The pH value in the aqueous solution is adequately selected and controlled depending upon the type of metal ion, and is preferably adjusted to a range of 6 to 11, more preferably 7 to 11. For stabilizing the pH value, a buffer solution or a salt having a buffer effect, such as sodium acetate, may be added.

If $M^{n+}$ ions to be coexistent with the ferrous ions develop a precipitation, the aqueous deoxidized solution (4) may be divided into two or more as shown, for example, by 4 and 4' in FIG. 2.

When the aqueous deoxidized solution (4) contains only $Fe^{2+}$ ions as the metal ion, the spinel ferrite which contains only iron as the metal element, that is, magnetite $Fe_3O_4$ or maghemite gamma-$Fe_2O_3$ film is obtained. When the aqueous solution (4) contains, in addition to the $Fe^{2+}$ ion, other metal ions $M^{n+}$ such as $Zn^{2+}$, $CO^{2,3+}$, $Ni^{2-}$, $Mn^{2,3+}$, $Fe^{3+}$, $Cu^{2+}$, $V^{3,4,5+}$, $Sb^{5+}$, $Li^+$, $Mo^{4,5+}$, $Ti^{4+}$, $Pd^{2+}$, $Mg^{2+}$, $Al^{3+}$, $Si^{4+}$, $Cr^{3+}$, $Sn^{2,4+}$, $Ca^{2+}$, $Cd^{2+}$, and $In^{3+}$, ferrite films containing metal elements such as cobalt ferrite ($Co_xFe_{3-x}O_4$) and nickel ferrites ($Ni_xFe_{3-x}O_4$) (when M is of one type) are obtained, or mixed crystalline ferrites such as Mn−Zx ferrites ($Mn_xZn_yFe_{3-x-y}O_4$) are obtained (when M is of several types). The invention can be applied to the preparation of any of these films.

It is essential that the aqueous deoxidized solution containing ferrous ions and used in the invention is prepared and stored under non-oxidizing conditions. For this reason, the water used for the preparation of the aqueous solution is usually deaerated and distilled water.

The substrate (5) used in the present invention may be a metallic or nonmetallic material, provided that it has surface activity to $FeOH^+$ absorption and resistance to said aqueous solutions. Such materials usable as the substrate include an alloy containing iron such as stainless steel; an iron oxide such as $Fe_3O_4$, gamma-$Fe_2O_3$, alpha-$Fe_2O_3$ or ferrite; a noble metal such as gold, platinum or paradium, one composed of saccharide such as sucrose and cellulose; and a plastic in the form of block, cylinder, and film, or attached to the surface of other substrate, and metal ions such as steel bonded to the surface of a solid. It is desirable that the surface of the substrate has a smoothness as well as the surface activity.

The surface activity of the substrate in the invention, if not originally possessed by the substrate, may be provided as a surface active layer on the substrate which does not originally have such a property. To form such a surface active layer, a coat of a material originally having such properties may be provided on the surface. To form the coating layer, if the substrate withstands high temperatures, it may be coated with a material such as iron oxides by a method such as spattering, vacuum decomposition, arc discharge, and welding. Otherwise, the surface layer may be formed by means of ordinary chemical plating. In addition to these methods, the pretreating method used to give surface activity by means of a plasma treatment on the substrate is also effective.

The plasma treatment mentioned here means production of surface activity caused by plasma produced by glow discharge, corona discharge, and microwave discharge. It can be caused under either atmospheric pressure or reduced pressure. The gases available are, for example, nitrogen, argon, helium, hydrogen, ammmonia, and oxygen containing gases such as oxygen, carbon dioxide, carbon monoxide, nitrogen dioxide, sulfur dioxide, and air, such reactive and nonreactive gases, or one or two or more types of these gases; preferably oxygen containing gases are used.

Materials showing effective surface activity by plasma treatment are either metallic or nonmetallic, and for the application to magnetic recording media metals such as aluminum and stainless steel, and nonmetals, for example, plastics such as polyethylene terephthalate, Teflon, acryl, and polycarbonate, silica glass, and mica may be mentioned.

The plasma treatment remarkably improves the wettability of the substrate by the aqueous solution and allows the formation of a thin of aqueous solution on the surface of the substrate.

The heating conditions for allowing the reaction to proceed is at a range below the boiling point, preferably at a range from 60° to 90° C.

The reaction of the invention is preferably attained in a substantially deoxidized atmosphere. In the presence of a large quantity of oxygen, unnecessary oxidation proceeds, which is contrary to the spirit of the present invention, i.e. to control oxidation. Specifically, the reaction proceeds in a nitrogen atmosphere.

According to the invention, a ferrite film can be formed at a very high efficiency. The formed ferrite film has uniform properties and uniform thickness of all areas by controlling the quantity and concentration of the supplying solution.

EXAMPLES

The present invention is illustrated by the following examples which, however, are not to be construed as limiting the invention.

Preparation of Aqueous FeCl₂ Solution

An aqueous $FeCl_2$ solution was prepared by dissolving 6 g of $FeCl_2$ in 1 liter of ion-exchanged water which had been deoxidized with $N_2$ gas and by adjusting the solution to pH 6.9 with ammonia.

Preparation of Mixed FeCl₂ and CoCl₂ Solution

A mixed $FeCl_2$ and $CoCl_2$ solution was prepared by dissolving 6 g of $FeCl_2$ and 3 g of $CoCl_2$ in 1 liter of ion-exchanged water which had been deoxidized with $N_2$ gas and adjusting the solution to a pH of 6.9 with ammonia.

Preparation of Aqueous MnCl₂ Solution

An aqueous $MnCl_2$ solution was prepared by dissolving 3 g of $MnCl_2$ in 1 liter of ion-exchanged water which had been deoxidized with $N_2$ gas and adjusting the solution to a pH of 10 with ammonia.

Preparation of Aqueous ZnCl₂ Solution

An aqueous, $ZnCl_2$ solution was prepared by dissolving 3 g of $ZnCl_2$ in 1 liter of ion-exchanged water which had been deoxidized with $N_2$ gas and adjusting the solution to a pH of 6.5 with ammonia.

Preparation of a Mixed FeCl₂ and MnCl₂ Solution

Six grams of $FeCl_2$ and 3 g of $MnCl_2$ were dissolved in 1 liter of ion-exchanged water which had been deoxidized with $N_2$ gas and adjusted to pH 7.2 with ammonia. If the pH was elevated higher than this, the solution became turbid.

Preparation of Aqueous Oxidizing Agent Solution 1

An aqueous $NaNO_2$ solution was obtained by dissolving 1 g of $NaNO_2$ in 1 liter of ion-exchanged water which had been deoxidized with $N_2$ gas and adjusting the solution to a pH of 6.9 with ammonia.

Preparation of Aqueous Oxidizing Agent Solution 2

A dissolved oxygen containing water was obtained by applying air bubbling to 1 liter of ion-exchanged water and adjusting the solution to a pH of 6.9 with ammonia. The dissolved oxygen content was 15 ppm.

Example 1

A polycarbonate disk (120 mm diameter, 1.2 mm thick) subjected to hydrophilic treatment by corona discharge was mounted on the apparatus shown in FIG. 1. While being rotated at 400 rpm and being sprayed with deoxidized ion-exchanged water, the disk was heated to 70° C. Then, $N_2$ gas was introduced into the apparatus to form a deoxidized atmosphere.

The aqueous $FeCl_2$ solution and aqueous oxidizing agent solution 1 were supplied on the polycarbonate disk each from a spray nozzle at a rate of 50 cc/min. When the polycarbonate disk was taken out after approximately 15 min, a black mirror film of approximately 0.5 micrometer had been formed on the disk surface. The results of X-ray diffraction showed that it was magnetite.

Example 2

A silica glass disk (130 mm diameter, 2 mm thick) with a polished surface was mounted on the apparatus shown in FIG. 1. While being rotated at 400 rpm and being sprayed with deoxidized ion-exchange water, the disk was heated to 70° C. Then, $N_2$ gas was introduced into the apparatus to establish a deoxidized atmosphere.

The mixed $FeCl_2$ and $CoCl_2$ solution and oxidizing agent solution were supplied on the silica glass disk each from a spray nozzle at a rate of 50 ml/min. When the silica glass disk was taken out after 15 min, a black mirror film of approximately 0.15 micrometer in thickness was found formed on the disk. The results of the composition analysis showed it was $Co_{0.3}Fe_{0.7}O_4$ film.

Example 3

A silica glass disk (130 mm diameter, 2 mm thick) with polished surface was mounted on the apparatus shown in FIG. 2. While being rotated at 400 rpm and being sprayed with deoxidized ion-exchange water, the disk was heated to 70° C. Then, $N_2$ gas was introduced into the apparatus to establish a deoxidized atmosphere.

The aqueous $FeCl_2$ solution, aqueous $MnCl_2$ solution, and aqueous oxidizing agent solution 1 were supplied on the polycarbonate disk each from a spray nozzle at a rate of 30 ml/min.

When the polycarbonate disk was taken out after approximately 15 min, a black mirror film of approximately 0.15 micrometer in thickness was found formed on the disk. The composition analysis showed it was a $Mn_{0.5}Fe_{2.5}O_4$ film.

Control 1

A silica glass disk (130 mm diameter, 2 mm thick) with a polished surface was mounted on the apparatus shown in FIG. 1. While being rotated at 400 rpm and being sprayed with deoxidized ion-exchanged water, the disk was heated to 70° C. Then, $N_2$ gas was introduced into the apparatus to form a deoxidized atmosphere.

The mixed $FeCl_2$ and $MnCl_2$ solution and oxidizing agent solution 1 were supplied on the polycarbonate disk each from a spray nozzle at a rate of 60 ml/min. When the polycarbonate disk was taken out after approximately 15 min, a black mirror film was found formed at a thickness of approximately 0.2 micrometer. The composition analysis showed little Mn contained in the film.

This shows that the introduction of the metal species into the ferrite film is different depending upon the adsorption to the ferrite film and pH dependence of the metal ion, and in certain circumstances the method of supplying to the substrate should be changed.

Example 4

A silica glass disk (130 mm diameter, 2 mm thick) with polished surface was mounted on the apparatus shown in FIG. 2 having an additional spray nozzle provided. While being rotated at 400 rpm and being sprayed with deoxidized ion-exchanged water, the disk was heated to 70° C. Then, $N_2$ gas introduced into the apparatus to establish a deoxidized atmosphere.

The aqueous $FeCl_2$ solution, aqueous $MnCl_2$ solution, aqueous $ZnCl_2$ solution, and aqueous oxidizing agent solution 2 were supplied on the silica glass disk from four spray nozzles each at a rate of 20 ml/min. When the polycarbonate disk was taken out after approximately 15 min, a black mirror film was found formed on the disk at a thickness of approximately 0.15 micrometer. The compositions analysis showed that it was $Mn_{0.2}Zn_{0.5}Fe_{2.3}O$.

What is claimed is:

1. A method for forming a ferrite film on a substrate comprising flowing downward or spraying an aqueous oxidizing agent solution on a substrate in an atmosphere which is substantively free of oxygen and simultaneously supplying an aqueous deoxidized solution containing at least ferrous ions under such conditions that both solutions are fluidized on the substrate so that they continuously flow over the substrate by the force of gravity or by centrifugal force, to effect a ferrite crystallization reaction on the substrate.

2. The method as claimed in claim 1, wherein the aqueous oxidizing agent solution contains a nitrite.

3. The method as claimed in claim 1, wherein the aqueous oxidizing agent solution is water containing dissolved oxygen.

4. The method as claimed in claim 1, wherein the aqueous deoxidized solution containing ferrous ions only contains ferrous ions.

5. The method as claimed in claim 1, wherein the aqueous deoxidized solution contains, in addition to the ferrous ions, $Zn^{2+}$, $Co^{2+}$, $Co^{3+}$, $Ni^{2-}$, $Mn^2$, $Mn^{3+}$, $Fe^{3+}$, $Cu^{2+}$, $V^{3+}$, $V^{4+}$, $V^{5+}$, $Sb^{5+}$, $Li^+$, $Mo^{4+}$, $Mo^{5+}$, $Ti^{4+}$, $Pd^{2+}$, $Mg^{2+}$, $Al^{3+}$, $Si^{4+}$, $Cr^{3+}$, $Sn^{2+}$, $Sn^{4+}$, $Ca^{2+}$, $Cd^{2+}$, or a mixture thereof.

6. The method as claimed in claim 1, wherein the aqueous deoxidized solution is divided into two or more portions when it contains ion species which can form precipitates with each other.

7. The method as claimed in claim 1, wherein the aqueous deoxidized solution is flowed downward or sprayed on the substrate from a nozzle different from that for the aqueous oxidizing agent solution.

8. The method as claimed in claim 1, wherein the surface of the substrate is pretreated with plasma.

9. The method as claimed in claim 1, wherein the aqueous solutions on the substrate continuously flow out from the surface of the substrate due to fluidity.

* * * * *